INVENTORS
JÖNS KURT ALVAR OLSSON
SVEN ARNE OLSSON
BY Hane and Nydick
ATTORNEYS

Dec. 10, 1968 J. K. A. OLSSON ET AL 3,416,147

REGISTER FOR RECORDING AND NON-DESTRUCTIVE READING OF BINARY INFORMATION

Original Filed July 10, 1958 3 Sheets-Sheet 2

INVENTORS
JÖNS KURT ALVAR OLSSON
SVEN ARNE OLSSON

BY Hane and Nydick

ATTORNEYS

INVENTORS
JÖNS KURT ALVAR OLSSON
SVEN ARNE OLSSON
BY Hane and Nydick
ATTORNEYS

United States Patent Office 3,416,147

Patented Dec. 10, 1968

3,416,147

REGISTER FOR RECORDING AND NON-DESTRUCTIVE READING OF BINARY INFORMATION

Jöns Kurt Alvar Olsson, Sundbyberg, and Sven Arne Olsson, Hagersten, Sweden, assignors to Telefonaktiebolaget L M Ericsson, Stockholm, Sweden, a Swedish corporation Original application July 10, 1958, Ser. No. 747,733, now Patent No. 3,157,861, dated Nov. 17, 1964. Divided and this aplication Oct. 1, 1964, Ser. No. 400,815

Claims priority, application Sweden, July 19, 1957, 6,788/57

1 Claim. (Cl. 340—174)

The present invention relates to an arrangement in magnetic memory matrices for enabling the information registered in the matrix to be read out without being erased.

This application is a division of our copending application Serial No. 747,733, filed on July 10, 1958, now Patent No. 3,157,861.

It is known to use ferromagnetic toroidal cores having a rectangular hysteresis loop as binary memory elements, e.g. in digital computers. When using cheap small dimension ferrite cores, the expense per bit for such a memory will be small. The core is then magnetized to any of its remanence states, the one position representing the binary digit "0," while the other position represents the binary digit "1." The information recorded in the cores is read out by impressing a magnetizing impulse on the cores, which is sufficient for changing the saturation state of the cores, said impulse having a certain direction, e.g. such a direction that it tries to reset the core to the remanence state corresponding to "0," a voltage pulse being obtained from the cores, which in this moment were magnetized to the remanence state corresponding to "1." When reading a memory of this kind the information of the cores will thus be erased, so that the memory is zero-set, and if it is desirable to retain the information, some kind of rewriting must be applied. This rewriting, which must be made at each registration, requires relatively complicated circuits, and moreover, the rewriting operation considerably increases the effective access time of the memory.

In order to cheapen the ferromagnetic core memories further, different methods for reading out the information of the cores without erasing the information at the same time have been developed. By utilizing the inertia of the so-called "domain walls," it has been possible to apply very short reading pulses of the size of 0.05 microsecond having an amplitude which for longer pulses is sufficient for changing the remanence state without the core being remagnetized. Suitably the reading pulses are immediately followed by a reset pulse, which enables a further increase of the size of the reading pulse without a change of the remanence state.

This method has, however, several disadvantages. It has not been practically possible to utilize the inertia of the domain walls except in toroidal cores consisting of very thin spirally wound bands of certain magnetic materials, but these cores are much more expensive than ferrite cores, which besides the feature of being cheaper to manufacture also can be given very small dimensions. The current pulses which are used for reading and resetting the core must be extremely short and must have a very high amplitude, causing the circuits for generating these current pulses to be very complicated.

The method according to the invention enables recording and non-destructive reading of a binary information in magnetic ring cores of a material, preferably of ferrite type, with marked remanence and saturation properties. The invention is characterized by the cores being first zero-set by being given a magnetizing impulse with a sufficient duration and amplitude in order to saturate the cores in a certain direction; the cores that are to record a binary one being then demagnetized to a value that is considerably smaller than the remanence, the recorded information being read by applying to the cores two consecutive magnetzing impulses having different polarity and an amplitude which is smaller than the coercive force.

The core is suitably demagnetized to such a value that the hysteresis curve, which is passed when reading a core recording a binary digit one, includes a domain where the reversible permeability is considerably larger than the reversible permeability of the hysteresis loop, which is passed when reading a core recording a binary digit zero.

The invention will be more detailed described in connection with the attached figures, where:

Figure 1:
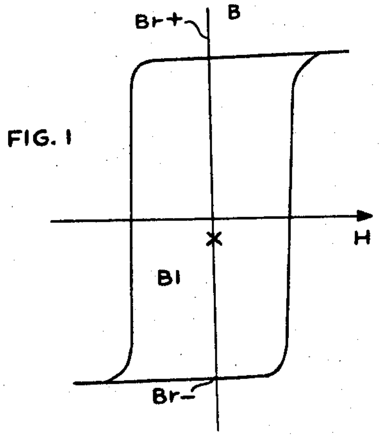
FIG. 1 shows a suitable hysteresis loop for a material adapted to be used in binary magnetic memories.

In FIG. 1 a hysteresis loop is shown for a magnetic material, e.g. a ferrite, adapted to be used in a magnetic memory matrix. The individual memory elements of the matrix are shaped as closed ring cores and the windings are simply wires, which are threaded through the cores. In such memory matrices the cores are saturated to either of the remanence points $Br+$ and $Br-$, and the core is, for instance, said to record a binary digit zero, if it saturated to $Br+$, and a binary digit one, if it is saturated to $Br-$. The cores are read out by means of a magnetizing pulse, which has a sufficient amplitude and duration to reset the core to remanence state, which corresponds to the binary digit "0." If a core contains the binary digit "1," the flux is considerably changed, and an induced voltage is obtained in a read-out winding, which surrounds the cores and generally consists of a single wire threaded through the core. On the other hand, a core which contains the binary digit "0" generates no signal. As mentioned in the introduction, the information recorded in the core will be erased, if no special precautions are taken for recording the information once again in the core.

According to the present invention the two remanence points $Br+$ and $Br-$ are not utilized in order to represent the binary digits "0" and "1," but either of the remanance points, e.g. $Br+$, is used to designate "0," while "1" is represented by a value $Bo$ of the flux density B, which is considerably smaller than $Br+$.

The digits are zero-set by a magnetizing current, the amplitude of which is sufficient to exceed the coercive force of the core and the duration of which is so long that the core can be transferred to the saturation state, e.g. $Br+$, which represents "0."

The cores that are to record a binary digit one are afterwards demagnetized so that the flux density B is reset to a value near zero. This value is not, however, especially critical, but can be varied within wide limits. The demagnetization can take place in different ways. A magnetizing pulse can, for instance, be applied to the core, which tries to transfer the core from the remanence state which represents the binary digit zero to the other remanence state, but this magnetizing pulse is made so short that the core is not fully remagnetized to this other remanence state, but the remagnetization is interrupted at a flux density B≈0. A binary digit "1" can also be recorded by exposing the core to a gradually decreasing AC magnetization current, the first period or periods of which are sufficient to reverse the magnetic state of the core entirely; i.e., the core is demagnetized in the way that is normally used in the technique.

Figure 2:
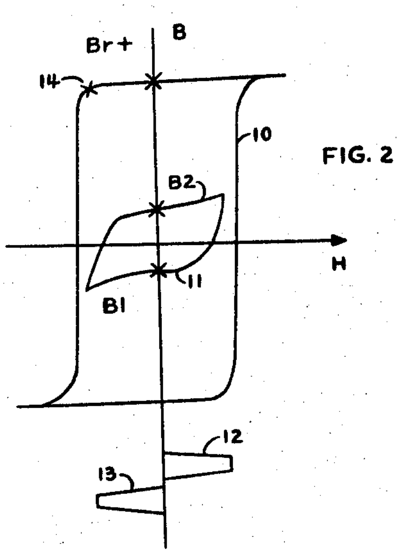
FIG. 2 shows the principle of the invention in connection with a pair of hysteresis loops.

The information recorded in the core is read according to FIG. 2 by means of a pulse the amplitude of which is not sufficient to reverse the magnetic state of the core; i.e. it is not to exceed the bend 14 on the hysteresis loop of a saturated core. The reading pulse is immediately followed by a reset pulse with mainly the same amplitude and duration. According to FIG. 2 the reading pulse is positive, while the reset pulse is negative, but it is also possible to use the opposite polarities.

Let it be assumed that a core is zero-set, i.e. that it has the remanence $Br+$; the hysteresis loop which is followed when reading, will as a matter of fact be equal to the upper horizontal part of the hysteresis loop, where the reversible permeability is very low. The voltage that is induced in a reading winding will therefore be very small. If, however, the core has the magnetic state which corresponds to a binary digit one, i.e. when it is mainly demagnetized, a small hysteresis loop 11 is followed. Let it be assumed that the flux density of the cores is B1 after the registration of a binary digit one, the hysteresis loop 11 of the reading pulse 12 will be followed to the flux density B2. During the following reset pulse 13 the magnetic state is reset to the point B1. Owing to the comparatively low magnetizing current required for bringing the magnetization around the inner, minor hysteresis loop and owing to the fact that a domain is passed during the reading pulse, where the reversible permeability is considerably larger than if the core is fully saturated (fully magnetized) the voltage induced in a reading winding will be considerably larger than if the core recording a zero is read.

The ones as well as the zeros recorded can be read an unlimited number of times by using symmetric reading pulses with a small amplitude according to the invention.

Figure 3:
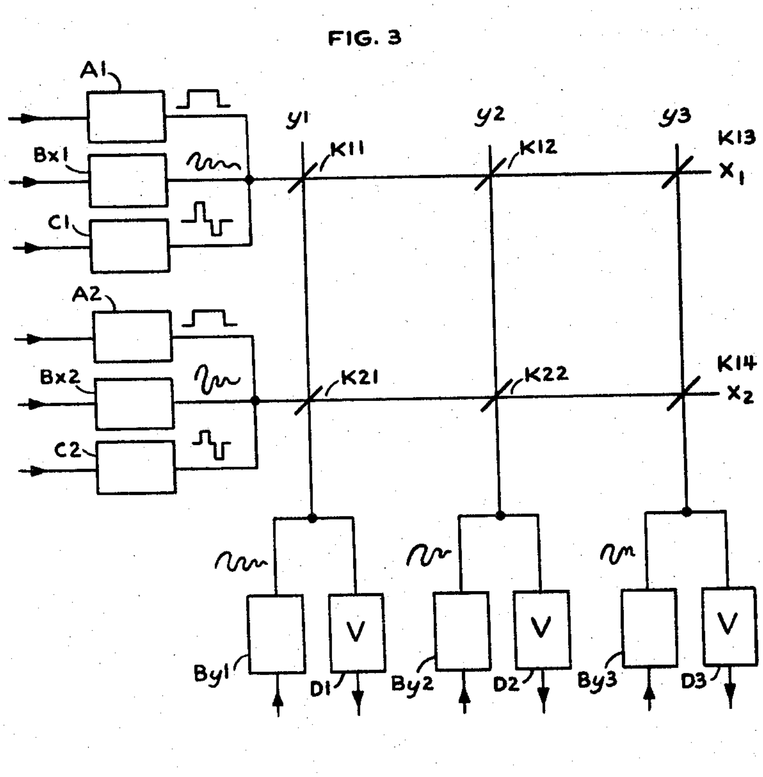
FIGS. 3, 4 and 6 show different embodiments of memory matrices according to the invention.

The reading method described above is suitable in the best way for memory matrices, where the cores are read according to the whole current method, i.e. one single winding is passing the entire reading current. FIG. 3 shows such a memory matrix, comprising a number of magnetic ring cores K11, K12 . . . K22, preferably made of ferrite. The conductors *x*1, *x*2, and *y*1, *y*2, *y*3 respectively are threaded through the cores.

Each *x*-row designates a three digit binary number; each *y*-column designates a digit position within these numbers. Each *x*-row is connected to three current sources, namely A1 and A2, for generating a relatively long pulse having an amplitude sufficient to magnetize all the cores, which are located in the respective *x*-row; B*x*1, B*x*2, which generate damped alternating current for demagnetizing of the cores, which are to record one; and C1, C2, which produce a symmetric reading pulse of the kind that is shown in FIG. 2. A current source B*y*1, B*y*2, B*y*3 for generating a damped alternating current of the same kind as generated by the current source B*x*1–B*x*2, as well as a reading amplifier D1–D3, is connected to each *y*-conductor. Each of the current sources B*x*1–B*x*2 and B*y*1–B*y*3 generates in the respective winding only half the current which is necessary for demagnetizing the core, and therefore coincidence is required between the current both in the *x*-row and in the *y*-column for actuating a core located in the cores point between said row and column. As is evident, the *x*-rows and the *y*-columns constitute two sets of rows crossing each other.

If a binary number, e.g. 101, is to be recorded in an *x*-row, e.g. *x*1, of the memory matrix, the current source A1 is first forced to generate an erasing pulse, which magnetizes all the cores in this row to saturation. Afterwards the cores K11 and K13 are demagnetized by the current sources B*x*1, and B*y*1, B*y*3 generating synchronous damped oscillations, which decrease the remanent flux density of the core, e.g. to a point B1 according to FIG. 2. The number 101 is now recorded in the matrix. The number recorded is read in the manner previously mentioned by sending a symmetric current pulse through all the cores in the pertaining row. In the cores which record ones, in this case K11 and K13, a relatively large flux change appears and a voltage is induced in the *y*-conductors (*y*1 and *y*3), which pass through these cores, and said pulses are amplified in the corresponding reading amplifier D1 and D3.

The blocks shown in FIG. 3 represent well-known circuits. The current source A1–A2 can be conventional monostable multivibrators, which when they are actuated by a trigger pulse, generate a pulse of a predetermined length and duration. The current sources B*x*1–B*x*2 and B*y*1–B*y*3 consist of so-called "ringing circuits," which in dependence on a starting impulse generate a damped sinusoidal oscillation. The current sources for reading and reset pulses consist of a suitable pulse generator, which generates a pulse of a certain polarity immediately followed by a pulse having the opposite polarity.

It is not necessary that the reading and the reset pulses be rectangular, but they may also be sinusoidal. The current source for reading and reset pulses can therefore consist of a usual blocking oscillator, which as is well known, can generate two consecutive mainly sinusoidal half periods having different polarities. The information recorded in the cores can, as earlier shown, be read an unlimited number of times, having no need for rewriting the information. When the information is to be changed, the erasing is made in an earlier mentioned way by means of the current source A pertaining to the *x*-row and the new information is registered by means of the current sources B*x* and B*y*.

It is, of course, possible too to erase the information, i.e. to record "0," by using two erasing current sources A, one for each coordinate, so that the information is erased only at coincidence. In this case the current of the erasing current sources is carefully selected, so that a current from only one current source shall not be able to drive a core from the position "1" to the position "0." First at coincidence between the erasing currents in two conductors, which pass the core, the core is to be driven to saturation.

In order to obtain a better percentage difference between the signals which are obtained in a reading wire when reading a core, which records "0" and "1" respectively, an additional core can be arranged in a known way on each reading wire, said core being always magnetized in "0" state. During each reading operation a reading current is also sent through this core, but the current has such a direction that the signal in the reading wire passing this core counteracts the signal which is obtained from the core which is read. The percentage reduction of the "0" signals is great, but the percentage reduction of the "1" signal will be small.

A memory matrix according to the invention can be modified in a great number of ways, especially concerning the current sources, which feed the matrix. Such a modification is shown in FIG. 4, where the details, which are already described in connection with FIG. 3, have the same legends as in the last-mentioned figure.

The current sources Bx and By for the damped alternating current impulses have in this case been replaced by a current source connected to each of the y-conductors, said source producing pulses having an amplitude which is insufficient alone to change the magnetic state of the core. The memory matrix is zero-set in the same way as is described above by causing the erasing current source A1, possibly in cooperation with the reading current source C1, to generate a current pulse the amplitude and duration of which is sufficient to saturate the core to the remanence position Br+ ,which indicates "0."

The digit "1" is recorded in the desired cores in a certain row by causing the current sources C and E, e.g. C1 and E1, to generate simultaneous pulses. The pulse from the current source E1 must have such a duration that it lasts during many, preferable 5–10, pulses from the current source C1. When the pulse from the current source E1 has ceased, the reading pulses continue still a number of times in a so-called "blind" reading operation in order to stabilize the magnetizing state, which designates "1." The blind reading pulses should be applied to all the rows in the matrix in order to eliminate the magnetization caused by the pulse from E1 in the other cores. It is evident that all the reading amplifiers D1, D2 are blocked during the recording and the blind reading operation.

Figure 4:
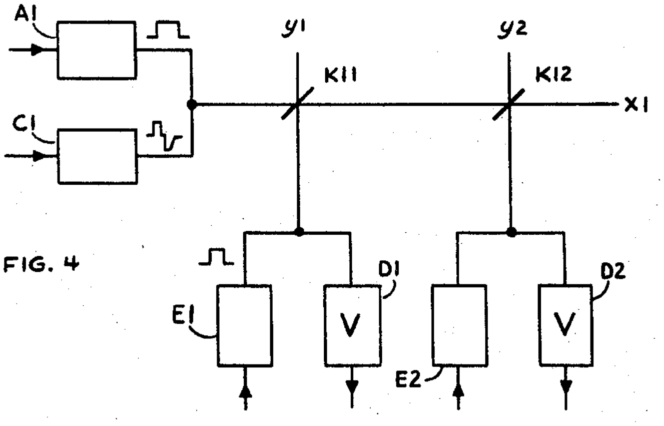
Figure 5:
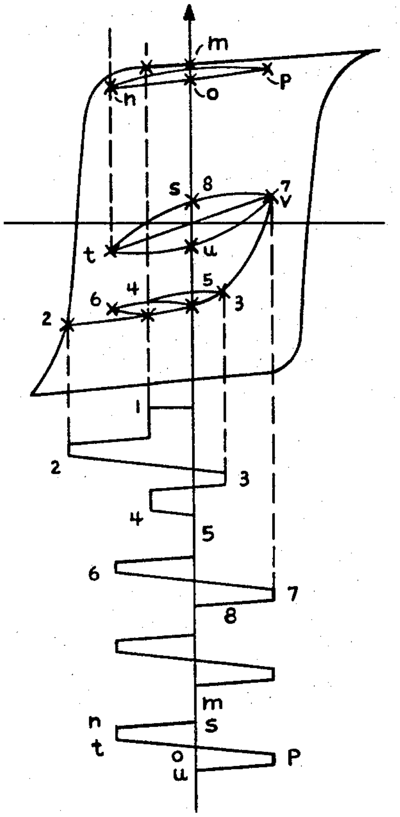
FIG. 5 shows the process for recording and reading out information in a memory matrix according to FIG. 4.

The changes in the magnetizing state of the core during the operations for recording and reading the information of the memory matrix according to FIG. 4 is described more closely in connection with FIG. 5. As earlier mentioned, the core is magnetized to the remanence point Br+ when zero-set. If "1" should be recorded, e.g. in the core K11, the current source E1 is connected to the conductor y1 and the current source C1 to the conductor x1. None of these current sources alone can generate a magnetizing current sufficient to exceed the knees of the hysteresis loop. The current E1 alone can reach the point 1, but as at the same time a magnetizing pulse having the same polarity is obtained from C1, the point located on the other side of the knee is reached. When the second half period of the reading pulse is immediately following the first period, the magnetic state corresponding to the point 3 is obtained. This transition from the point 1 via the point 2 to 3 takes place gradually and the curve shown in FIG. 5 between the points 2 and 3 refers to the final state after several pulses. When the writing pulse from E1 ceases, the point 5 is reached via the point 4 according to the figure. During the following blind reading pulses, of which only two are shown in the figure, the magnetic state is brought from 5 via 6, 7 to the point 8, which represents "1." Also this transition is made gradually and FIG. 5 shows only the principal way how this is made. The cores, in which "1" has not been recorded, are brought by the blind reading pulses to the remanence position m around the loop m–n–o–p.

The reading can now be made, the cores going through the hysteresis loops m–n–o–p and s–t–u–v respectively, depending on "0" or "1" being recorded in the core. Owing to the previous blind reading operation the magnetic states have been stabilized so that the same hysteresis loops are always passed and thus also reproducible output signals.

Figure 6:
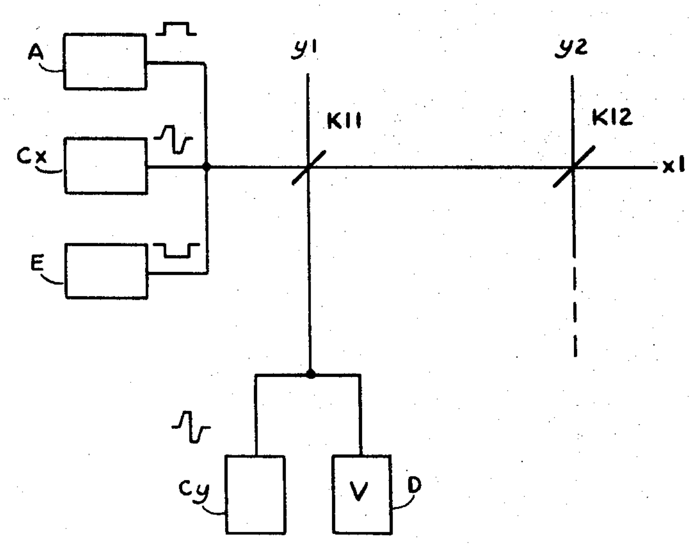

The blind reading operation described in connection with FIG. 4 should be used also when utilizing other alternatives for recording information, e.g. at the operation described in connection with FIG. 3 in order to obtain fully reproducible output signals. Different kinds of blind reading operations for magnetic memory matrices are earlier known and they are not included in the protection claimed. A further alternative embodiment of a memory matrix according to the invention is shown in FIG. 6. In this embodiment, which is similar to the one shown in FIG. 4, there are a reading pulse source Cx and a similar source Cy for each row and column respectively, while a writing source E is connected to each row. The information is recorded by coincidence between the pulses from the current source Cy in the column and from the current source E in the row for the desired core. When the pulse from the current source E has ceased, it is sufficient, if the actual pulse generator Cy goes on sending a number of pulse periods instead of using a particular blind reading operation. The reading is made by means of pulses from the current source of the row to be read.

The invention can be modified in several ways without losing the idea of the invention. It is for instance not necessary that the reading pulses be symmetric, as provided in the above description, but a comparatively high degree of assymmetry can be permitted. It is the case especially when the pulse that tends to bring the core against the "0" position is the larger half wave. The position for "1" in the hysteresis loop will then be somewhat displaced compared to the core shown in FIG. 5.

It is also possible to read the information stored by sending a constant bias pulse through the entire matrix and to apply pulses counteracting the bias current through the row to be read. Said pulses can thus have the same direction and they should have an amplitude which is about twice the bias current.

It is also possible to write information by means of coincidence between continuous reading pulses applied to the row and (a) a damped sinusoidal wave on the column for writing a binary "1",
(b) a DC pulse on the column for writing "0" or "1" depending on the amplitude of the DC pulse.

In practicing the arrangement of (a) above, with reference to FIG. 3 for example, reading pulses from a unit such as C1 or C2 applied to a row and a damped sinusoidal wave from a unit such as By1 applied to a column could be used for writing purposes, observing a relationship between the pulses from C1 or C2 and By1 similar to the relationship described between pulses C1 and E1 of FIG. 4 (see column 5, line 14); i.e. 5–10 pulses, for example, from C1 (FIG. 3) during each half cycle of the damped sinusoidal wave from By1 (FIG. 3).

Previously in the specification was described the program for writing "0" in a whole row and for writing "1" in certain cores of said row. It is of course also possible to write "1" in a whole row by demagnetizing the cores in said row by means of a damped sinusoidal wave, and to write "0" in certain cores in the row, for example, with the method described under (b) above.

Sometimes it can be suitable to read the information stored in a core during the second pulse of the pulse pair used for reading purposes. The first pulse is then a reset pulse which provides that the core will get the same magnetic state before each reading operation even if it has been disturbed by an intermediate writing operation.

What is claimed is:

1. A register for recording and non-destructive reading of binary information, said register comprising, in combination, a matrix formed by two sets of rows of cores crossing each other, each of said cores including a magnetic ring core made of a material having high remanence and saturation characteristics and supporting a read-out winding, a high impedance means for each row in one set of rows connected and arranged for feeding to the cores in said one set of rows a magnetizing current pulse having a duration and amplitude such that the respective cores are magnetized to a state of remanence with a saturation characteristic significant for reading pulses, recording and reading means for each row in both sets of rows for feeding simultaneously two coincident signals for changing the magnetization of each core at the crossing point of two rows to a state of magnetization having no saturation characteristic significant for reading pulses, one of said coincident signals comprising continuous reading pulses and the other of said coincident signals comprising a damped sinusoidal wave, said recording and reading means being also connected and arranged for feeding to the rows of cores in said one set of rows two successive reading pulses having different polarities and low amplitudes, said reading pulses leaving unchanged the state of remanence of the cores in said one set of rows due to the low amplitudes of said reading pulses, an indicating means for each row in the other set of rows connected to the cores in said other set, and indicating voltage pulses in the windings of cores at the crossing points between each two rows.

References Cited

UNITED STATES PATENTS

| | | | |
|---|---|---|---|
| 2,768,312 | 10/1956 | Goodale et al. | 340—174 X |
| 2,832,945 | 4/1958 | Christiansen | 340—174 |
| 2,886,801 | 5/1959 | Briggs | 340—174 |

BERNARD KONICK, *Primary Examiner.*

J. F. BREIMAYER, *Assistant Examiner.*

U.S. Cl. X.R.

340—166